(12) United States Patent
Li et al.

(10) Patent No.: US 11,194,906 B2
(45) Date of Patent: Dec. 7, 2021

(54) AUTOMATED THREAT ALERT TRIAGE VIA DATA PROVENANCE

(71) Applicant: NEC Laboratories America, Inc., Princeton, NJ (US)

(72) Inventors: Ding Li, Franklin Park, NJ (US); Kangkook Jee, Princeton, NJ (US); Zhengzhang Chen, Princeton Junction, NJ (US); Zhichun Li, Princeton, NJ (US); Wajih Ul Hassan, Champaign, IL (US)

(73) Assignee: NEC Corporation

( * ) Notice: Subject to any disclaimer, the term of this patent is extended or adjusted under 35 U.S.C. 154(b) by 257 days.

(21) Appl. No.: 16/507,353

(22) Filed: Jul. 10, 2019

(65) Prior Publication Data
US 2020/0042700 A1    Feb. 6, 2020

Related U.S. Application Data

(60) Provisional application No. 62/712,431, filed on Jul. 31, 2018.

(51) Int. Cl.
 *G06F 21/55* (2013.01)
 *G06F 21/56* (2013.01)

(52) U.S. Cl.
 CPC .......... *G06F 21/554* (2013.01); *G06F 21/552* (2013.01); *G06F 21/56* (2013.01); *G06F 2221/034* (2013.01)

(58) Field of Classification Search
 CPC ...... G06F 21/554; G06F 21/56; G06F 21/552; G06F 2221/034
 See application file for complete search history.

(56) References Cited

U.S. PATENT DOCUMENTS

| | | | |
|---|---|---|---|
| 9,292,695 B1 * | 3/2016 | Bassett | G06F 21/577 |
| 9,516,053 B1 * | 12/2016 | Muddu | H04L 63/1433 |
| 10,666,666 B1 * | 5/2020 | Saurabh | H04L 63/1425 |
| 10,873,596 B1 * | 12/2020 | Bourget | G06N 5/047 |
| 2007/0209074 A1 | 9/2007 | Coffman | |
| 2016/0301704 A1 * | 10/2016 | Hassanzadeh | H04L 63/1433 |
| 2016/0330226 A1 | 11/2016 | Chen et al. | |
| 2018/0013787 A1 * | 1/2018 | Jiang | H04L 29/06 |

OTHER PUBLICATIONS

Dhammi et al, "Behavior Analysis of Malware Using Machine Learning", 2015, IEEE, p. 1-6.*
Bierma et al, "Learning or Rankfor Alert Triage", 2016, IEEE, p. 1-5.*

(Continued)

*Primary Examiner* — Christopher A Revak
(74) *Attorney, Agent, or Firm* — Joseph Kolodka

(57) ABSTRACT

A method for implementing automated threat alert triage via data provenance includes receiving a set of alerts and security provenance data, separating true alert events within the set of alert events corresponding to malicious activity from false alert events within the set of alert events corresponding to benign activity based on an alert anomaly score assigned to the at least one alert event, and automatically generating a set of triaged alert events based on the separation.

17 Claims, 5 Drawing Sheets

(56) References Cited

OTHER PUBLICATIONS

Xueyuan Han et al "Provenance-based Intrusion Detection: Opportunities and Challenges" arxiv:1806.00934v1, Jun. 4, 2018, URL https://arvix.org/pdf/1806.00934v1.pdf—See pp. 1, 3.
Chandola, "Anomaly Detection: A Survey", ACM Computing Surveys, vol. 41, No. 3, Sep. 2009, 72 pages.
Stolfo, "Anomaly Detection in Computer Security and Application to File System Accesses", Foundations of Intelligent Systems, May 2005, pp. 14-28.
Chen, "Entity Embedding-Based Anomaly Detection for Heterogeneous Categorical Events", Proceedings of the 25th International Joint Conference on Artificial Intelligence, 2016, pp. 1396-1403.
Bates, "Trustworthy Whole System Provenance for the Linux Kernel," USENIX Security Symposium, Aug. 2015, pp. 319-334.
Lee, "High Accuracy Attack Provenance via Binary-based Execution Partition", NDSS Symposium, Apr. 2013, 16 pages.
Ma, "ProTracer: Towards Practical Provenance Tracing by Alternating Between Logging and Tainting", NDSS Symposium, Feb. 2016, 15 pages.
Pohly, "Hi-Fi: Collecting High-Fidelity Whole-System Provenance", ACSAC, Dec. 2012, pp. 259-268.
Bates, "Take Only What You Need: Leveraging Mandatory Access Control Policy to Reduce Provenance Storage Costs", TaPP, Jul. 2015, 5 pages.
Park, "A Provenance-based Access Control Model", Tenth Annual International Conference on Privacy, Security and Trust, Jul. 2012, pp. 137-144.

\* cited by examiner

AUTOMATED THREAT ALERT TRIAGE VIA DATA PROVENANCE

RELATED APPLICATION INFORMATION

This application claims priority to provisional application Ser. No. 62/712,431, filed on Jul. 31, 2018, incorporated by reference herein in its entirety.

BACKGROUND

Technical Field

The present invention relates to computer security, and more particularly to intrusion and threat detection.

Description of the Related Art

Automated threat detection systems (TDS) such as, e.g., intrusion detection systems (IDS) and/or security information and event management tools (SIEM), can use heuristics and single events (e.g., anomalous process and/or malicious file creation) to combat threats (e.g., advanced persistent threats (APTs)) by monitoring enterprise-wide activities and generating threat alerts for suspicious activities. Each threat alert can then be investigated by cyber analysts to determine whether the corresponding suspicious activity is malicious (e.g., a true alert) or benign (e.g., a false positive or false negative alert. However, TDS can generate large numbers of alerts, including large numbers of false alerts. Additionally, in some cases, a false alert can look similar to a true alert. For example, since both ransomware and ZIP program can read/write many files in a short period of time, a ransomware detector that only checks the behavior of a single process may erroneously classify a ZIP program as ransomware.

SUMMARY

According to an aspect of the present invention, a method for automated threat alert triage via data provenance is provided. The method includes receiving, by an alert triage system, a set of alerts and security provenance data. The security provenance data provides alert context by reconstructing a chain of events that lead to an alert event and/or ramifications of the alert event. The method further includes separating, by the alert triage system, true alert events within the set of alert events corresponding to malicious activity from false alert events within the set of alert events corresponding to benign activity based on an alert anomaly score assigned to the at least one alert event. Separating the true alert events from the false alert events includes receiving at least one dependency graph derived from the security provenance data corresponding to at least one alert event of a set of alert events, and obtaining a subgraph of the at least one dependency graph based on a propagation of path anomaly scores corresponding to respective paths including sequences of dependency events from the at least one dependency graph. The dependency graph includes nodes representing system objects and edges representing causal relationships between the system objects. The method further includes automatically generating, by the alert triage system, a set of triaged alert events based on the separation.

In accordance with another embodiment of the present invention, a system for automated threat alert triage via data provenance is provided. The system includes a memory device for storing program code and at least one processor device operatively coupled to the memory device. The at least one processor device is configured to execute program code stored on the memory device to receive a set of alerts and security provenance data. The security provenance data provides alert context by reconstructing a chain of events that lead to an alert event and/or ramifications of the alert event. The at least one processor device is further configured to separate true alert events within the set of alert events corresponding to malicious activity from false alert events within the set of alert events corresponding to benign activity based on an alert anomaly score assigned to the at least one alert event. The at least one processor device is configured to separate the true alert events from the false alert events by receiving at least one dependency graph derived from the security provenance data corresponding to at least one alert event of a set of alert events, and obtaining a subgraph of the at least one dependency graph based on a propagation of path anomaly scores corresponding to respective paths including sequences of dependency events from the at least one dependency graph. The dependency graph includes nodes representing system objects and edges representing causal relationships between the system objects. The at least one processor device is further configured to automatically generate a set of triaged alert events based on the separation.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
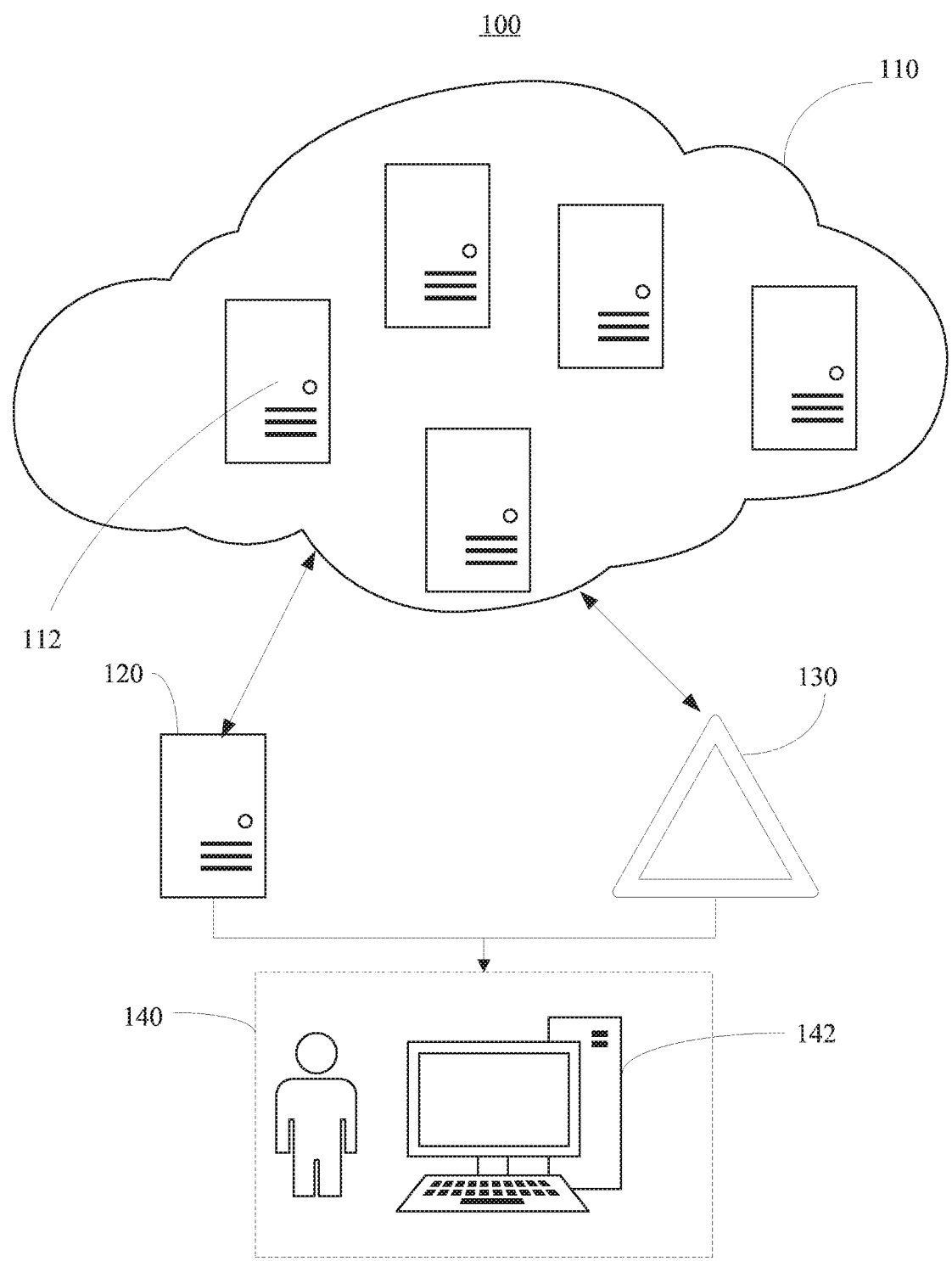
FIG. 1 is a block/flow diagram of a high-level overview of an online monitoring and analysis system, in accordance with an embodiment of the present invention.

The embodiments described herein provide for systems and methods that can perform automated threat alert triage via data provenance. More specifically, the embodiments described herein can employ a suspiciousness or anomaly propagation method on provenance data using a dependency graph to automatically reduce the false alert rate of threat detection systems. Since a process created by a malicious process is more suspicious than a process created by a benign process, in accordance with the embodiments described herein, the suspiciousness of an event can be adjusted based on the suspiciousness of its neighbors in the dependency graph. Accordingly, the embodiments described herein can ameliorate an information overload problem ("threat alert fatigue") in which cyber analysts fail to respond to threat alerts if an enormous number of alerts are generated, thereby improving alert detection and remediation.

For example, a node suspiciousness or anomaly score can be assigned to each node corresponding to an alert event in the dependency graph, which can be used to determine a subgraph suspiciousness or anomaly score of each subgraph of the dependency graph. To determine the subgraph anomaly scores, the node anomaly scores can be propagated using, e.g., a random walk propagation method, based on statistical models and domain knowledge, and a path suspiciousness or anomaly score can be assigned to each path of the dependency graph based on the propagation. If the subgraph anomaly score of a subgraph is sufficiently high (e.g., exceeds a threshold), this indicates that the subgraph likely corresponds to a true attack. Otherwise, the subgraph likely corresponds to a false alert. That is, only sufficiently suspicious or anomalous alert events need to be investigated to identify true attacks with high confidence.

Such simplified, precise subgraphs can help analysts better understand attacks or discover system vulnerabilities by providing concise and complete descriptions of threat alerts, thereby reducing costs associated with discovering system vulnerabilities. Accordingly, the embodiments described herein can substantially reduce the size of dependency graphs while maintaining sufficient information for investigating alert events (e.g., attack scenarios).

The suspiciousness propagation method in accordance with the embodiments described herein can be fully automated, can reduce the number of false alerts while maintaining substantially full attack detection capability. Therefore, the embodiments described herein can allow for the application of data provenance analysis-based threat detection to large scale enterprise environments. Additionally, the embodiments described herein provide for generality in that they can be applied independent of underlying platform, applications and threat or intrusion detection systems. Accordingly, the embodiments described herein can provide high fidelity detection, can have a low average runtime overhead, and can be deployed within any suitable threat detection system with minimal overhead.

Referring now in detail to the figures in which like numerals represent the same or similar elements and initially to FIG. 1, a block/flow diagram is provided illustrating a high-level overview of an online monitoring and analysis system 100. The system 100 can be implemented within an enterprise environment (e.g., a large-scale enterprise environment).

As shown, system 100 includes a group 110 of computer systems 112, at least one processing device (e.g., server) 120 for storing security provenance data, an anomaly detection system 130 for generating alerts based on detected anomalies, and an alert triage system 140. The group 110 can be monitored by agents.

The processing device 120 and the anomaly detection system 130 are each shown in communication with the group 110 and the alert triage system 140. The alert triage system 140 can receive input from the processing device 120 and the anomaly detection system 130. As will be described in further detail below, the system 100 can employ a fully automated method to substantially reduce the size of dependency graphs while keeping attack scenarios. Such precise dependency graphs can better assist analysts with understanding attacks and/or discovering system vulnerabilities.

In one embodiment, the anomaly detection system 130 can include a plurality of detectors. For example, a first detector can be deployed to monitor network data transfer and generate an alert when a data transfer amount is abnormally large (e.g., exceeding a threshold), and a second detector can be deployed to monitor process creation and generate an alert when a process starts an unexpected child process.

One goal of the alert triage system 140 is to identify whether an alert corresponds to suspicious or anomalous activity. For example, as will be described in further detail herein below, the alert triage system 140 can determine the existence of a suspicious or anomalous subgraph from a dependency graph associated with an alert. More specifically, each path of the dependency graph can be assigned a suspiciousness or anomaly score, which can be computed from suspiciousness or anomaly information propagated from its nodes or vertices, and edges. If a suspicious subgraph of the dependency graph does not exist, then the alert is determined to be a false alarm. Otherwise, the alert is determined to correspond to a true attack.

Figure 2:
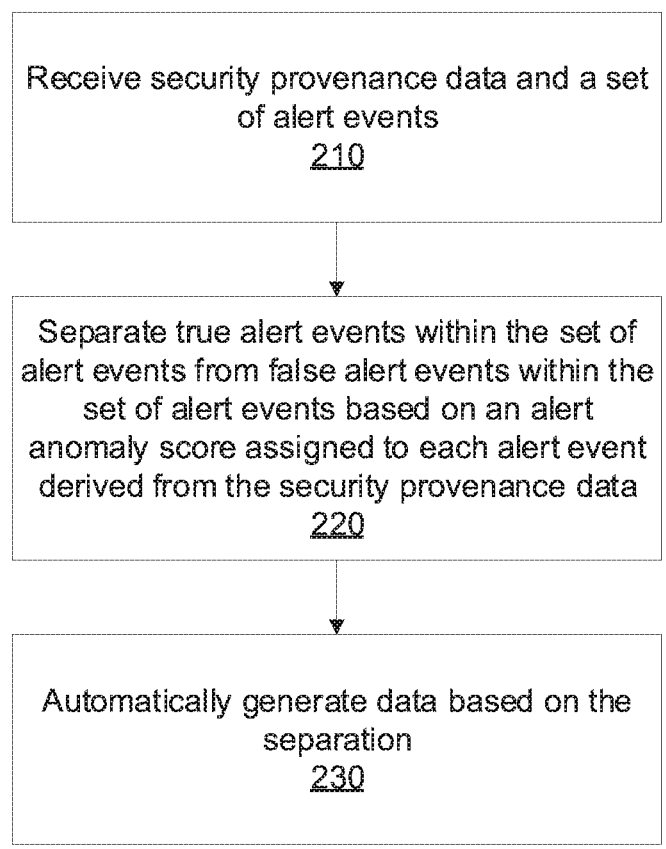
FIG. 2 is a block/flow diagram of a system/method for implementing automated threat alert triage via data provenance, in accordance with an embodiment the present invention.

With reference to FIG. 2, a block/flow diagram is provided illustrating a system/method 200 for implementing automated threat alert triage via data provenance. As will be described in further detail, the system/method 200 can be implemented within the system 100 to leverage historical context to automatically reduce false alert rates of threat detection systems (TDS). The system/method 200 can be implemented by an alert triage system, as will be described in further detail below with reference to FIGS. 4 and 5.

At block 210, data including security provenance data and a set of alert events is received. The security provenance data can be generated by another processing device, and the set of alert events can be generated by an anomaly detection system. The security provenance data can provide alert context. For example, the security provenance data can provide alert context by reconstructing the chain of events that lead to an alert event (e.g., backward tracing) and/or ramifications of the alert event (e.g., forward tracing). As an illustrative example, by considering the provenance of an alert event, ransomware program activity can be distinguished from ZIP activity (e.g., the entry point of ransomware, such as, e.g., an e-mail, is different from the entry point of the ZIP program).

As will be described in further detail below, such knowledge can be used to improve separation of a benign system event from a malicious system event, even if the benign and malicious system events look very similar on their face. For example, it may be possible to distinguish a malicious activity (e.g., from an unknown source) from benign activity (from a trusted source) based on the security provenance data.

At block 220, true alert events within the set of alert events are separated from false alert events within the set of alert events based on an alert suspiciousness or anomaly score assigned to each alert event derived from the security provenance data. The true alert events are those alert events determined to correspond to malicious activity, while the false alert events are those alerts determined to correspond to benign activity. Separating the true alert events from the false alert events can include filtering out alert events from the set of alert events having a sufficiently low suspiciousness or anomaly score. In one embodiment, the alert events of the set of alert events can be ranked based on anomaly scores. For example, a given alert event can have a sufficiently low anomaly score if its anomaly score is less than a threshold suspiciousness parameter. The threshold suspiciousness parameter can be a user-specified parameter. Alternatively, the threshold suspiciousness parameter can be a default system parameter.

A suspicious or anomaly score of an alert event can be obtained by quantifying a "rareness" (e.g., transition probability) of relevant events associated with the alert event that have occurred. For example, an aggregate suspiciousness or anomaly score can be obtained by combining suspiciousness or anomaly scores associated with ancestry and/or progeny behaviors associated with the alert event. More specifically, the progeny and/or ancestry of an alert event can be analyzed to determine whether the progeny and/or ancestry of the alert event include rare events (e.g., low transition probability events) or common events (e.g., high transition probability events).

A naïve way to assign an anomaly score to an alert event would be to use a frequency of system events that have happened in the past, such that rare events are considered more suspicious or anomalous. However, such an approach may not hold since some attacks can involve events that occur often in a system. For example, unzipping a file can be a common event in an enterprise environment, but it could also be an event that led to an attack. Accordingly, simple frequency-based approaches to find suspicious events may not be suitable to identifying true attacks.

To address these situations, a suspiciousness or anomaly score of an alert event can be determined by analyzing a suspiciousness of a chain of sub-events associated with the alert event. More specifically, path suspiciousness scores associated with the chain of sub-events can be assigned to paths of different lengths using historical and contextual information. For example, if a chain of sub-events occurring after the file is unzipped is determined to be uncommon (e.g., initiating a large number of IP connections in a short period of time), then the path can be considered to be highly suspicious.

As will be described in further detail below with reference to FIG. 3, the anomaly score of an alert event can be obtained by generating a threat alert dependency graph based on security provenance data, which can include nodes representing system objects or subjects and edges representing causal relationships between the system objects or subjects. More specifically, the path anomaly scores can be determined by propagating node suspiciousness or anomaly scores of nodes of the dependency graph, and a subgraph can be extracted from the dependency graph based on the path anomaly scores.

As an illustrative example, consider a first event $e_1:=$<dropper.exe, y.y.y.y:445, IP_Write> and a second event $e_2:=$<Powershell→z.z.z.z:445>. That is, the first event $e_1$ corresponds to the edge connecting a "dropper.exe" process node and a "y.y.y.y:45" socket node, and the second event $e_2$ corresponds to the edge connecting a "Powershell" process node and a "z.z.z.z:45" socket node.

The events $e_1$ and $e_2$ can be generated by an underlying threat detection system (TDS) as part of a set of 100 total alert events generated over the course of the day. The first event $e_1$ could have been generated when malware made several connections to remote machines in the enterprise, and the second event $e_2$ could have been generated when technical support diagnostic tool initiated a remote connection to a secure machine. Note that, at a single event level, $e_1$ and $e_2$ can appear to be very similar, since both processes make an unusual socket connection to important internal hosts.

To investigate the events $e_1$ and $e_2$ and prepare a response, a causality analysis can be performed (e.g., by a cyber analyst). Provenance-based tools can process individual events between system objects (e.g., files and network sockets) and subjects (e.g., processes) to construct a dependency graph, and the ancestry and progeny of each of these alert events can be considered using, e.g., backward and forward tracing, to determine that the behavior of each of these alert events is different.

For example, the progeny of the first alert event $e_1$ can include several events that are rarer (e.g., have a lower transition probability). Additionally, in the ancestry of the first event $e_1$, a chain of sub-events in which an executable is downloaded using a web browser and then connects to a large number of hosts in a short period of time is very rare and thus has a high anomaly score. As a result, when the ancestry and progeny behaviors of the first event $e_1$ are combined, a high aggregate anomaly score can be assigned for the first event $e_1$.

In contrast, the progeny of the second event $e_2$ can include a chain of sub-events that are quite common in an enterprise environment because such behaviors are exhibited by common OS utilities. Moreover, the ancestry of the second event $e_2$ can include diagnostic events that are regularly performed to check the health of computers in the enterprise environment (e.g., Tasklist and Ipconfig). As a result, when the ancestry and progeny behaviors of the second event $e_2$ are combined, an aggregate anomaly score lower than that of the first event $e_2$ can be assigned for the second event $e_2$.

Further details regarding the implementation of block 220 to separate true alerts from false alerts will be described below with reference to FIG. 3.

At block 230, data is automatically generated based on the separation. The data can include a set of triaged alert events that exclude the false alerts identified at block 220.

Figure 3:
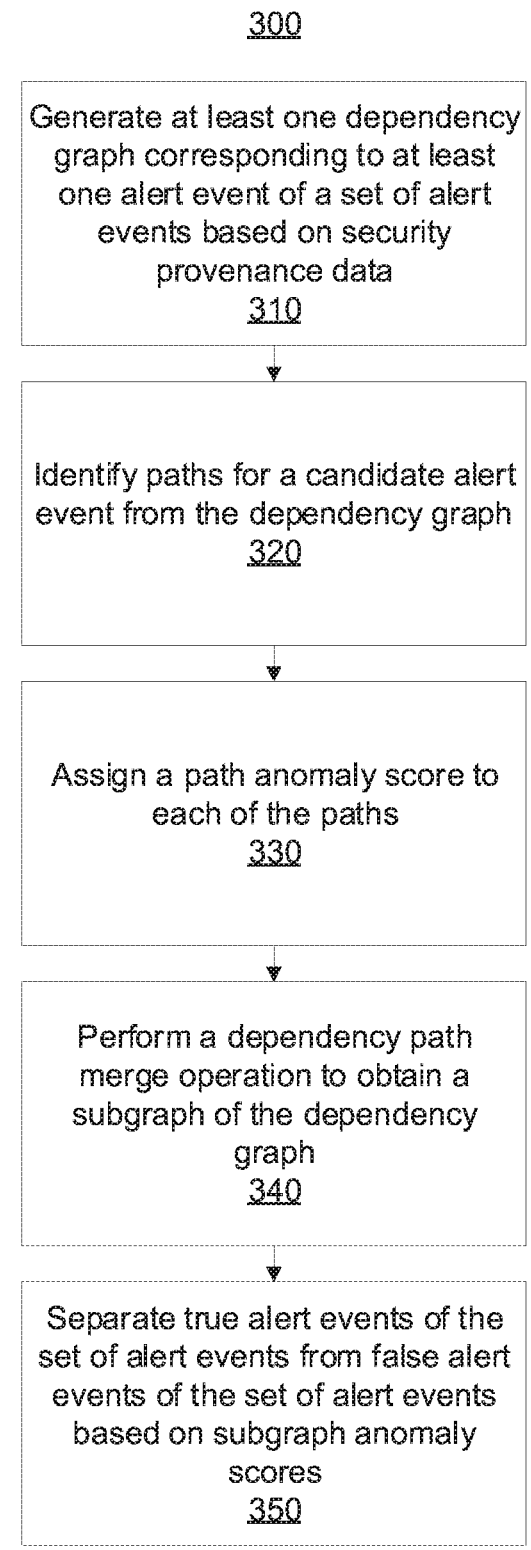
FIG. 3, is a block/flow diagram of a system/method for separating true alerts from false alerts within the system/method of FIG. 2, in accordance with an embodiment the present invention.

With reference to FIG. 3, a block/flow diagram is provided illustrating a system/method 300 for separating true alerts within a set of alerts from false alerts within the set of alerts based on an alert suspiciousness score assigned to each alert derived from the security provenance data.

At block 310, at least one threat alert dependency graph ("dependency graph") corresponding to at least one alert event of a set of alert events is generated based on security provenance data. The set of alert events can include n alert events $\{e_1, \ldots, e_n\}$. The dependency graph can include nodes representing system objects or subjects, and edges representing causal relationships between the system objects or subjects. The dependency graph can have a corresponding amount of completeness.

More specifically, each edge of the dependency graph can correspond to a dependency (causal) event e. A dependency event e can be represented as a tuple of <SRC, DST, REL>, where SRC∈{process}, which is a process entity that initiates information flow, DST∈{process; file, socket}, which are process, file socket entities which receive the information flow, and REL represents the information flow relationship. The following table describes dependency event relationships including SRC, DST and REL:

TABLE 1

| SRC | DST | REL |
|---|---|---|
| Process | Process | Start; End |
| Process | File | Write; Read; Execute |
| Process | Socket | Write; Read |

Illustratively, with respect to dependency event $e_1$:=<dropper.exe, y.y.y.y:445, IP_Write>, "dropper.exe" refers to SRC, "y.y.y.y:445" refers to DST and "IP_Write" refers to REL.

At block 320, dependency paths ("paths") for a candidate alert event are identified from the dependency graph. A path P of a dependency graph G can refer to a sequence of dependency events that were a root cause of an alert event e (e.g., $e_1, e_2, \ldots e_i$) and a sequence of dependency events that were ramifications of the dependency event e (e.g., $e_{i+1}, e_{i+2}, \ldots e_n$).

Paths can illustratively be divided into categories. For example, paths can be divided into control dependency (CD) paths and data dependency (DD) paths. A CD path of a dependency event e, $P_{CD}$, is a sequence of alert events that includes only control relationship events. For example, $P_{CD}=\{e_1, e_2, \ldots e_n\}$ such that all REL$\in$\{Pro_Start, Pro_End\}. A DD path of a dependency event e, $P_{DD}$, is a sequence of alert events that includes only data relationship events. For example, $P_{DD}=\{e_1, e_2, \ldots e_n\}$ such that all REL$\notin$\{Pro_Start, Pro_End\}.

For example, given the dependency graph G of an alert event e, identifying the paths can include searching for all paths having a threshold parameter length, which can be a user-defined parameter, or a default parameter. To do so, depth-first traversal can be run in a backward and forward fashion from the alert event e and combined to generate unified paths. For example, the dependency graph can be used to understand alert context by using a backward tracing query which starts from the alert (e.g., symptom event), and identifying all of the subjects and objects that the alert directly and indirectly depends on. Using a forward tracing query, effects induced by the root cause of the alert can be identified. Accordingly, each unified path can include both ancestry and progeny causal events of the alert.

At block 330, a path suspiciousness or anomaly score is assigned to each of the paths. The path anomaly scores can be propagated along neighboring edges (events) of the dependency graph. Assigning the path anomaly scores can include calculating and propagating node suspiciousness scores using a propagation model. The propagation model can be trained based on the security provenance data. For example, the propagation model can be trained based at least in part on historical event data included within the security provenance data. In one embodiment, a random walk label propagation method can be used to propagate the suspiciousness scores along the edges of the given dependency graph.

For example, in one embodiment, assigning the path anomaly scores includes calculating the path anomaly scores based on a transition probability of system events. For example, an N×N transition matrix M can be built for the dependency graph G, where N is a total number of nodes in G. Each matrix entry of M, $M_e$, can be computed by the following equation:

$$M_e = \frac{|Freq(e)|}{|Freq_{src_{rel}}(e)|}$$

where Freq(e) represents how many times the alert event e has happened in the historic time window where SRC DRT and REL of the tuple are the same, and $Freq_{src_{rel}}(e)$ represents how many times the alert event e has happened where only SRC and REL are the same. That is, $M_e$ represents a probability of occurrence of the alert event e. If the alert event e never happens, then the probability of occurrence is 0, while if the alert event e is the only event between SRC and any other entity with REL in the historical information, then the probability of occurrence is 1. Intuitively, $M_e$ denotes that the information flows between corresponding nodes in the dependency graph G.

Illustratively, consider again the dependency event $e_1$:=<dropper.exe, y.y.y.y:445, IP_Write> as described above. Freq($e_1$) can be calculated by counting the number of events that have happened where SRC="dropper.exe", DST="y.y.y.y:445" and REL="IP_Write". Then, $Freq_{src_{rel}}(e_1)$ can be calculated by counting the number of events where SRC="dropper.exe" and REL="IP_Write" (DST can be any entity node).

The number of events used to build the transition probability matrix can be obtained using an event frequency database (EFD) that stores frequencies of all of the events that have previously happened in the enterprise environment. The EFD can be built by collecting operating system (OS) events from a number of peer systems. For example, the EFD can periodically store and update event frequencies in the enterprise environment. Abstraction rules can be defined to remove instance-specific and non-deterministic information from each event to generate the event frequency database for all of the machines in the enterprise environment. Accordingly, the node anomaly scores can quantify a "rareness" of candidate events as compared to other events.

The transition probability for a candidate event tells us a frequency with which a particular source flows to a particular destination. However, this value will ultimately be propagated through the dependency graph. Thus, a total amount of data flowing out of the source and a total amount of data flowing into the destination can also be accounted for.

To account for this data flow, an IN score and an OUT score (e.g., an IN score vector and an OUT score vector) can be defined for each node in the dependency graph G. The IN and OUT scores represent the importance of the system object represented by the node as an information receiver and sender, respectively. More specifically, the IN and OUT scores can be based on a frequency of receiving by, and sending from, the system object, respectively.

To assign IN and OUT scores to a candidate process entity node/vertex v in the dependency graph G, a historical behavior of the candidate entity can be checked globally in the enterprise. For example, let m be a fixed time window length. The length m can be user-specified. For example, the length m can be set by a user to, e.g., 24 hours. Alternatively, the length m can be a default length.

A period from the time v is added to the dependency graph, $T_0$, to a current timestamp, $T_n$, can be partitioned into a sequence of time windows T=\{$T_0, T_1, \ldots, T_N$\}, where $T_i$ is a time window of length m. If there is no new edge to/from v in the window $T_i$, then $T_i$ can be defined as a stable window. The IN and OUT scores of v, IN(v) and OUT(v), respectively, can be calculated using the following equations:

$$IN(v) = \frac{|T'_{to}|}{|T|}$$

-continued $$OUT(v) = \frac{|T'_{from}|}{|T|}$$

where $|T'_{to}|$ is the count of stable windows in which no edge connects to v, $|T'_{from}|$ is the count of stable windows in which no edge connects from v, and $|T|$ is the total number of windows. Accordingly, the IN and OUT scores can each range from zero to one, inclusive.

To understand the intuition behind these equations, consider an example where v constantly has new edges going out from it while there is no edge going in. In such a case, v can have a very low IN score, and its OUT score can be high. If there is suddenly an edge going into v, it is abnormal. If v has no stable window (e.g., the node always has new edges in every window), its score is 0 and, if all of the windows of v are stable, then its score is 1. For example, if the window length m is set to 24 hours, the stability of v can be determined by the days that v has no new edges and the total number of days.

In contrast to the process entity type described above, data entities cannot be assigned global scores because the behavior of data entities can vary from host to host in the enterprise. Instead, local values can be defined in terms of "low" and "high" IN and OUT scores for data entities.

One example of a data entity is a file entity. IN and OUT scores for file entities can be assigned based on file entity type. For example, one file entity type is temporary file. Temporary files are file entities which are only written and never read in the dependency graph. Temporary files can be given high IN and OUT scores since they usually do not contribute much to suspiciousness scores. Another file entity type is executable file. Executable files can be given low IN and OUT scores since they are usually used in the attack vector and are thus important senders and receivers of information. Yet another file entity type is known malicious file extension. An online database of known malicious file extensions can be used to assign low IN and OUT scores known malicious file extensions since they are highly anomalous or suspicious.

Another example of a data entity is a socket entity. IN and OUT scores for socket entities can be assigned based on domain knowledge. For example, an online database of malicious IP addresses can be used to assign low IN and OUT scores.

Once the transition probability matrix and IN and OUT score calculations are performed, the path anomaly score of each path can be calculated. For example, calculating the path anomaly score can include calculating a regularity score of each path. Illustratively, given a path $p=(e_1 \ldots e_l)$ of length l, the regularity score of the path p, RS(p), can be calculated by the following formula:

$$RS(P) = \prod_{i=1}^{l} IN(SRC_i) \times M(e_i) \times OUT(DST_l)$$

where IN and OUT are the sender and receiver vectors, and M in the transition probability matrix. The term $IN(SRC_i) \times M(e_i) \times OUT(DST_j)$ measures the regularity of the event e that $SRC_i$ sends information to $DST_j$ entities. After the regularity score is calculated, the path suspiciousness or anomaly score, AS(P), can then be calculated as follows:

$$AS(P)=1-RS(P)$$

According to this equation, if path P involves at least one abnormal event, it will be assigned a high anomaly score.

As an illustrative example of an implementation of blocks 310-330, given an alert event $e_\alpha$ and a maximum path length threshold $\tau_l$ as inputs, a list of dependency path and score pairs, L<P, AS>, can be output. More specifically, a dependency graph $G_\alpha$ can be obtained for the alert event $e_\alpha$, and SRC and DST vertices for the alert event $e_\alpha$ ($V_{SRC}$ and $V_{DST}$). Backward and forward traversal of $G_\alpha$ can be performed based on the maximum path length threshold $\tau_l$ and the SRC and DST verticies $V_{SRC}$ and $V_{DST}$, respectively, to obtain a set of backward tracing dependency paths $L_b$ and a set of forward tracing dependency paths $L_f$. Then, the sets of paths $L_b$ and $L_f$ can be combined to obtain a set of combined paths $L_p$. A transition matrix can be generated based on the set of combined paths $L_p$ and, for each path P of the set of combined paths $L_p$, a path anomaly score AS can be calculated in accordance with the embodiments described herein, and appended to the list of dependency path and score pairs L<P, AS>.

The backward and forward traversal described above can be performed using D depth-bounded depth-first search (DFS) traversal. Here, the time complexity can be represented by $O(|b^D|)$ where b is the branching factor of the input dependency graph $G_\alpha$. Additionally, since the regularity score calculation runs for each path, the time complexity of the regularity score calculation can be represented by $O(|P'D|)$, where P' is the total number of dependency paths for the alert event.

In the previously described process for calculating the path suspiciousness scores, it may be apparent that longer paths can have higher path suspiciousness scores than shorter paths by virtue of their lengths. To eliminate or reduce such path length score bias, assigning the path anomaly scores can further include normalizing the calculated path suspiciousness scores so that scores of paths of different length can have the same distribution. For example, to eliminate or reduce path length score bias, a sampling-based approach can be used to find a decay factor, a, which can progressively decrease the path suspiciousness score.

For example, given a list of false alert causal events $L_e$, a baseline length k and a maximum path length threshold $\tau_l$ as inputs, a decay factor α can be output. More specifically, for each alert, paths of different maximum lengths $\tau_l$ can be obtained, a path anomaly or suspiciousness score can be calculated for those paths, and a map can be generated that includes a key-value store of path length and average suspiciousness scores for each path length. The map can be used to calculate a ratio by which the score increases with increasing length from the baseline length k, which can be set to the decay factor α. For example, a list of dependency path and score pairs, L<P, AS> can be obtained using, e.g., the process implemented at block 330 and, for each event in the list $L_e$, an anomaly or suspiciousness score can be calculated for the event based on $\tau_l$ and the average of the anomaly scores for each path length can be taken and stored in the map. The decay factor α can then be set by calculating the ratio at which the score increases with increasing length from the baseline length k.

Once the decay factor is calculated, a normalized regularity score, $RS'^{(P)}$, can be calculated as follows for obtaining a normalized suspiciousness score for a given path P of length l:

$$RS'(P) = \prod_{i=1}^{l} IN(SRC_i) \times M(e_i) \times OUT(DST_l) \times \alpha$$

Blocks 310-330 utilize a diffusion process that propagates anomaly scores on the edges of a dependency graph to generate an aggregate anomaly score. In some embodiments, the diffusion process can be parallelized using large-scale vertex-centric graph processing frameworks (e.g., enabling distributed graph processing). Additionally, blocks 310-330 generate a complete dependency graph and propagate the anomaly score on that dependency graph. However, in some embodiments, the anomaly score can be propagated while generating the dependency graph using iterative deepening depth first search. In such embodiments, the analysis can be stopped if anomaly scores do not increase in the next iteration. In this way, the additional step of first generating a potentially large dependency graph can be eliminated. Moreover, dependency graph compression techniques can be used to reduce the space overhead of provenance tracking, and provenance visualization techniques can be used to facilitate the data provenance analysis. As such, these techniques do not remove any benign events for efficient alert triage and investigation, and blocks 310-330 can use these techniques to further decrease the overhead of backward and forward tracing by removing redundant alert events.

As attacks can be performed in multiple steps, it may not be possible to capture the complete causality of a true alert event by returning the single most anomalous or suspicious dependency path. Likewise, returning a full dependency graph including all of the paths to cyber analysts can be inaccurate because the full dependency graph can include both suspicious paths and benign paths unrelated to the alert.

To strike a balance between these two extremes, at block 340, a dependency path merge operation can be performed to obtain a subgraph of the dependency graph. The subgraph corresponds to a true alert dependency graph that includes dependency paths with high anomaly scores. For example, the subgraph can have paths of at most a threshold parameter length, which can be user-specified or default. Accordingly, the subgraph can be a simplified, concise dependency graph that substantially captures attack behaviors derived from the input dependency graph.

A naïve approach to obtaining the subgraph at block 340 would be to return the top k paths when ranked by anomaly score. For example, since not all attacks may include the same number of steps, such an approach could lead to the admission of benign paths or the exclusion of truly anomalous paths. Instead, the dependency path merge operation performed at block 340 uses a best effort approach to merge paths together in order to obtain an optimally anomalous or suspicious subgraph. More specifically, the dependency path merge operation performed at block 350 can merge high anomaly score paths until the difference is greater than a merge threshold $\tau_m$ that quantifies the difference between the scores of benign paths and truly anomalous paths.

To calculate a suitable value for the merge threshold $\tau_m$, a training phase can be used to calculate the average difference between anomalous and benign paths. While the availability of labeled training data that features true attacks may seem prohibitive, an enterprise environment utilizing the system/method 300 can employ trained cyber analysts who produce training data as a natural artifact of their work. Additionally, the merge threshold $\tau_m$ may only need to be calculated once per deployment.

For example, a list of dependency path P and score S pairs, $L_{PS}$, and a merge threshold $\tau_m$ can be obtained as inputs. The list $L_{PS}$ can be sorted by anomaly scores. Then, for each $i \epsilon [0, |L_{PS}|-1]$ (where $|L_{PS}|$ refers to the size of $L_{PS}$), the ith and (i+1)th dependency path and anomaly score pairs of $L_{PS}$ are compared. For example, the difference between the score corresponding to the ith pair and the score corresponding to the (i+1)th pair can be compared to the merge threshold $\tau_m$. If the difference between the scores is less than the threshold, then the paths are merged.

At block 350, true alert events of the set of alert events can be separated from false alert events of the set of alert events based on suspiciousness or anomaly scores for each alert event of the set of alert events. For example, the separation at block 350 can include comparing suspiciousness or anomaly scores to a threshold suspiciousness parameter. The threshold suspiciousness parameter can be calculated using a training dataset with true attacks and false alarms, and the value of the threshold suspiciousness parameter can depend on the current enterprise configuration (e.g., the number of hosts and system monitoring events). Subgraphs determined to have subgraph suspiciousness scores less than the threshold based on the comparison are considered to correspond to false alerts associated with benign activity, while subgraphs determined to have subgraph suspiciousness scores exceeding the threshold based on the comparison are considered to correspond to true alerts.

Figure 4:
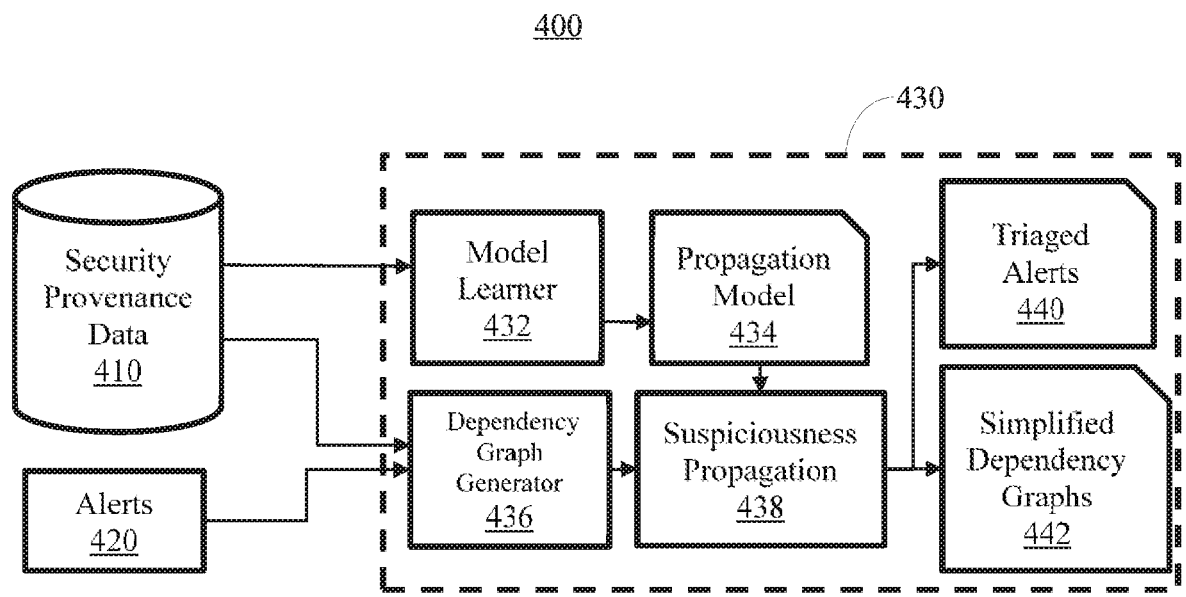
FIG. 4 is a block/flow diagram of a system/method for automated threat alert triage via data provenance, in accordance with an embodiment of the present invention.

With reference to FIG. 4, a block/flow diagram is provided illustrating an exemplary system 400 for implementing automated threat alert triage via data provenance. The system 400 can implement the embodiments described above with reference to FIGS. 2 and 3.

The system/method includes an alert triage system 430 that can receive security provenance data 410 and a set of alerts 420. For example, the security provenance data 410 can be received from a processing device (e.g., the processing device 120 of FIG. 1), and the set of alerts 420 can be received from an anomaly detection system (e.g., the anomaly detection system 130 of FIG. 1). The alert triage system 430 can be the same as the alert triage system 140 of FIG. 1.

To identify suspicious activity, the alert triage system 430 can include a model learner component 432. The component 432 can receive the security provenance data 410, and can output a propagation model 434 based on the security provenance data 410. For example, the component 432 can read historic event data included within the security provenance data 410, and train the propagation model 434 based at least in part on the historic event data.

Figure 5:
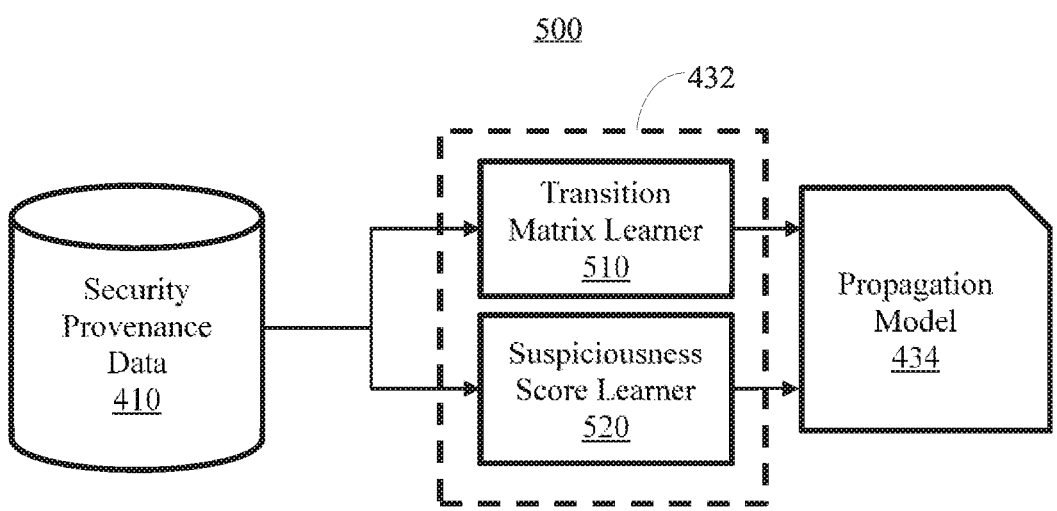
FIG. 5 is a block/flow diagram of a system/method for implementing model learning within the system/method of FIG. 4, in accordance with an embodiment the present invention.
Figure 6:
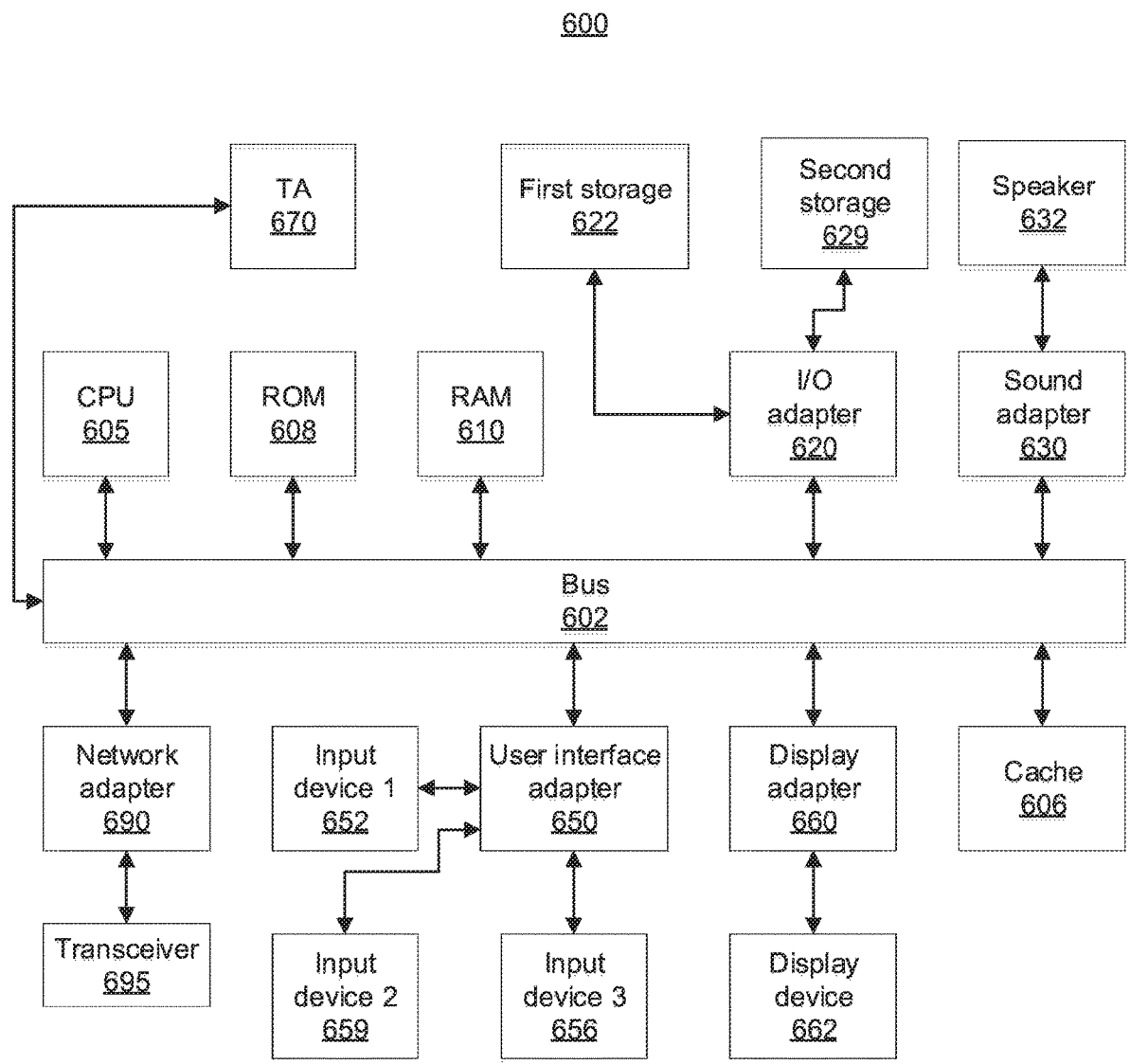
FIG. 6 is a block/flow diagram illustrating a computer system, in accordance with an embodiment the present invention.

With reference to FIG. 5, a block/flow diagram is provided illustrating an exemplary system 500 for implementing the component 432 of FIG. 4. As shown, the component 432 can include a transition matrix learning component 510 and a suspicious score learner component 520. The security provenance data 410 is received by the components 510 and 520 for training and outputting the propagation model 434, as described above with reference to FIGS. 3-4.

Referring back to FIG. 4, the alert triage system 430 can further include a dependency graph generator component 436. The component 436 can receive the security provenance data 410 and the set of alerts 420, and can generate at least one dependency graph corresponding to at least one alert of the set of alerts 420 based on the security provenance data 410. Further details regarding the operation of the component 436 are described above with reference to FIG. 3.

The alert triage system 430 can further include a suspiciousness propagation component 438. The component 438 can receive the propagation model 434 and the dependency graph generated by the component 436, can propagate node suspiciousness or anomaly scores of the nodes of the dependency graph along the edges of the dependency graph to its neighbors, and can assign a path suspiciousness or anomaly score to each path of the dependency graph based on the node anomaly scores.

The suspiciousness propagation component 438 can generate data including a set of triaged alerts 440 and a set of simplified dependency graphs 442. The set of simplified dependency graphs 442 can include subgraphs generated based on the path anomaly scores, as described above with reference to FIG. 3.

The set of triaged alerts 440 by automatically detecting and eliminating at least some of the false alerts from the set of alerts 420 corresponding to benign activity based on the subgraph suspiciousness scores. That is, true alerts from the set of alerts 420 corresponding to malicious activity can be separated from the false alerts. The set of simplified dependency graphs 442 can include a set of concise dependency graphs substantially capturing attack behaviors.

The embodiments described herein can be implemented within any suitable threat detection tool (e.g., as an add-on to threat detection toos). That is, the embodiments described herein can detect true attacks based on alerts generated by an underlying threat detection tool to improve accuracy of the threat detection tool (e.g., by improving false positive/negative detection and alert rates). By filtering out alerts generated by alert generations systems, the embodiments described herein can reduce the size of dependency graphs for threat alerts by generating simplified dependency graphs, and improve the ability of the threat detection tools to identify malicious activity within an enterprise environment. For example, embodiments described herein are resilient to changes in file and process names by using data provenance, which captures true causality and not merely correlations. To that end, even if an attacker initiates a malware attack with a known benign program name, the causality of the program (e.g., how it spawned and what changes it induced) differentiate its behavior from the normal behavior of the known benign program name.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to FIG. 5, an exemplary computer system 500 is shown which may represent a server or a network device, in accordance with an embodiment of the present invention. The computer system 500 includes at least one processor (CPU) 505 operatively coupled to other components via a system bus 502. A cache 506, a Read Only Memory (ROM) 508, a Random-Access Memory (RAM) 510, an input/output (I/O) adapter 520, a sound adapter 530, a network adapter 590, a user interface adapter 550, and a display adapter 560, are operatively coupled to the system bus 502.

A first storage device 522 and a second storage device 529 are operatively coupled to system bus 502 by the I/O adapter 520. The storage devices 522 and 529 can be any of a disk storage device (e.g., a magnetic or optical disk storage device), a solid state magnetic device, and so forth. The storage devices 522 and 529 can be the same type of storage device or different types of storage devices.

A speaker 532 may be operatively coupled to system bus 502 by the sound adapter 530. A transceiver 595 is operatively coupled to system bus 502 by network adapter 590. A display device 562 is operatively coupled to system bus 502 by display adapter 560.

A first user input device 552, a second user input device 559, and a third user input device 556 are operatively coupled to system bus 502 by user interface adapter 550. The user input devices 552, 559, and 556 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used, while maintaining the spirit of the present invention. The user input devices 552, 559, and 556 can be the same type of user input device or different types of user input devices. The user input devices 552, 559, and 556 are used to input and output information to and from system 500.

Alert triage (AT) component 570 may be operatively coupled to system bus 502. AT component 570 is configured to perform one or more of the operations described above. AT component 570 can be implemented as a standalone special purpose hardware device, or may be implemented as software stored on a storage device. In the embodiment in which AT component 570 is software-implemented, although shown as a separate component of the computer system 500, AT component 570 can be stored on, e.g., the first storage device 522 and/or the second storage device 529. Alternatively, AT component 570 can be stored on a separate storage device (not shown).

Of course, the computer system 500 may also include other elements (not shown), as readily contemplated by one of skill in the art, as well as omit certain elements. For example, various other input devices and/or output devices can be included in computer system 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 500 are readily contemplated by one of ordinary skill in the art given the teachings of the present invention provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for implementing automated threat alert triage via data provenance, comprising:
   receiving, by an alert triage system, a set of alerts and security provenance data, wherein the security provenance data provides alert context by reconstructing a chain of events that lead to an alert event and/or ramifications of the alert event;
   separating, by the alert triage system, true alert events within the set of alert events corresponding to malicious activity from false alert events within the set of alert events corresponding to benign activity based on an alert anomaly score assigned to the at least one alert event, including:
      receiving at least one dependency graph derived from the security provenance data corresponding to at least one alert event of a set of alert events, the dependency graph including nodes representing system objects and edges representing causal relationships between the system objects; and
      obtaining a subgraph of the at least one dependency graph based on a propagation of path anomaly scores corresponding to respective paths including sequences of dependency events from the at least one dependency graph; and
   automatically generating, by the alert triage system, a set of triaged alert events based on the separation, wherein separating the true alert events from the false alert events further includes:
      identifying the paths from the at least one dependency graph, including searching for all paths having a threshold parameter length by employing backward and forward tracing; and
      assigning the path anomaly scores to the respective paths.

2. The method of claim 1, wherein receiving the at least one dependency graph further includes generating the at least one dependency graph based on the security provenance data.

3. The method of claim 1, wherein assigning the path anomaly scores further includes calculating path regularity scores based on a transition probability of system events and IN and OUT scores corresponding to the nodes of the dependency graph, and calculating the path anomaly scores based on the path regularity scores.

4. The method of claim 3, wherein the transition probability of system events is obtained from a transition matrix built based on event frequency by using an event frequency database that stores frequencies of events by collecting operating system events from a number of peer systems.

5. The method of claim 3, wherein assigning the path anomaly scores further includes calculating the path anomaly scores by normalizing the path regularity scores based on a decay factor to reduce path length score bias.

6. The method of claim 1, wherein obtaining the subgraph further includes performing a dependency path merge operation based on the path anomaly scores, including comparing differences between pairs of path anomaly scores to a merge threshold.

7. A computer program product comprising a non-transitory computer readable storage medium having program instructions embodied therewith, the program instructions executable by a computer to cause the computer to perform a method for implementing automated threat alert triage via data provenance, the method performed by the computer comprising:
   receiving, by an alert triage system, a set of alerts and security provenance data, wherein the security provenance data provides alert context by reconstructing a chain of events that lead to an alert event and/or ramifications of the alert event;
   separating, by the alert triage system, true alert events within the set of alert events corresponding to malicious activity from false alert events within the set of alert events corresponding to benign activity based on an alert anomaly score assigned to the at least one alert event, including:
      receiving at least one dependency graph derived from the security provenance data corresponding to at least one alert event of a set of alert events, the dependency graph including nodes representing system objects and edges representing causal relationships between the system objects; and
      obtaining a subgraph of the at least one dependency graph based on a propagation of path anomaly scores corresponding to respective paths including sequences of dependency events from the at least one dependency graph; and
   automatically generating, by the alert triage system, a set of triaged alert events based on the separation, wherein separating the true alert events from the false alert events further includes:
      identifying the paths from the at least one dependency graph, including searching for all paths having a threshold parameter length by employing backward and forward tracing; and assigning the path anomaly scores to the respective paths.

8. The computer program product of claim 7, wherein receiving the at least one dependency graph further includes generating the at least one dependency graph based on the security provenance data.

9. The computer program product of claim 7, wherein assigning the path anomaly scores further includes calculating path regularity scores based on a transition probability of system events and IN and OUT scores corresponding to the nodes of the dependency graph, and calculating the path anomaly scores based on the path regularity scores.

10. The computer program product of claim 9, wherein the transition probability of system events is obtained from a transition matrix built based on event frequency by using an event frequency database that stores frequencies of events by collecting operating system events from a number of peer systems.

11. The computer program product of claim 9, wherein assigning the path anomaly scores further includes calculating the path anomaly scores by normalizing the path regularity scores based on a decay factor to reduce path length score bias.

12. The computer program product of claim 7, wherein obtaining the subgraph further includes performing a dependency path merge operation based on the path anomaly scores, including comparing differences between pairs of path anomaly scores to a merge threshold.

13. A system for implementing automated threat alert triage via data provenance, comprising:
a memory device for storing program code; and
at least one processor operatively coupled to a memory device and configured to execute program code stored on the memory device to:
receive a set of alerts and security provenance data, wherein the security provenance data provides alert context by reconstructing a chain of events that lead to an alert event and/or ramifications of the alert event;
separate true alert events within the set of alert events corresponding to malicious activity from false alert events within the set of alert events corresponding to benign activity based on an alert anomaly score assigned to the at least one alert event by:
receiving at least one dependency graph derived from the security provenance data corresponding to at least one alert event of a set of alert events, the dependency graph including nodes representing system objects and edges representing causal relationships between the system objects; and
obtaining a subgraph of the at least one dependency graph based on a propagation of path anomaly scores corresponding to respective paths including sequences of dependency events from the at least one dependency graph; and
automatically generate a set of triaged alert events based on the separation,
wherein the at least one processor is further configured to separate the true alert events from the false alert events by:
identifying the paths from the at least one dependency graph, including searching for all paths having a threshold parameter length by employing backward and forward tracing; and
assigning the path anomaly scores to the respective paths by calculating path regularity scores based on a transition probability of system events and IN and OUT scores corresponding to the nodes of the dependency graph, and calculating the path anomaly scores based on the path regularity scores.

14. The system of claim 13, wherein the at least one processor is further configured to receive the at least one dependency graph by generating the at least one dependency graph based on the security provenance data.

15. The system of claim 13, wherein the transition probability of system events is obtained from a transition matrix built based on event frequency by using an event frequency database that stores frequencies of events by collecting operating system events from a number of peer systems.

16. The system of claim 13, wherein the at least one processor is further configured to assign the path anomaly scores by calculating the path anomaly scores by normalizing the path regularity scores based on a decay factor to reduce path length score bias.

17. The system of claim 13, wherein the at least one processor is further configured to obtain the subgraph by performing a dependency path merge operation based on the path anomaly scores by comparing differences between pairs of path anomaly scores to a merge threshold.

* * * * *